UNITED STATES PATENT OFFICE.

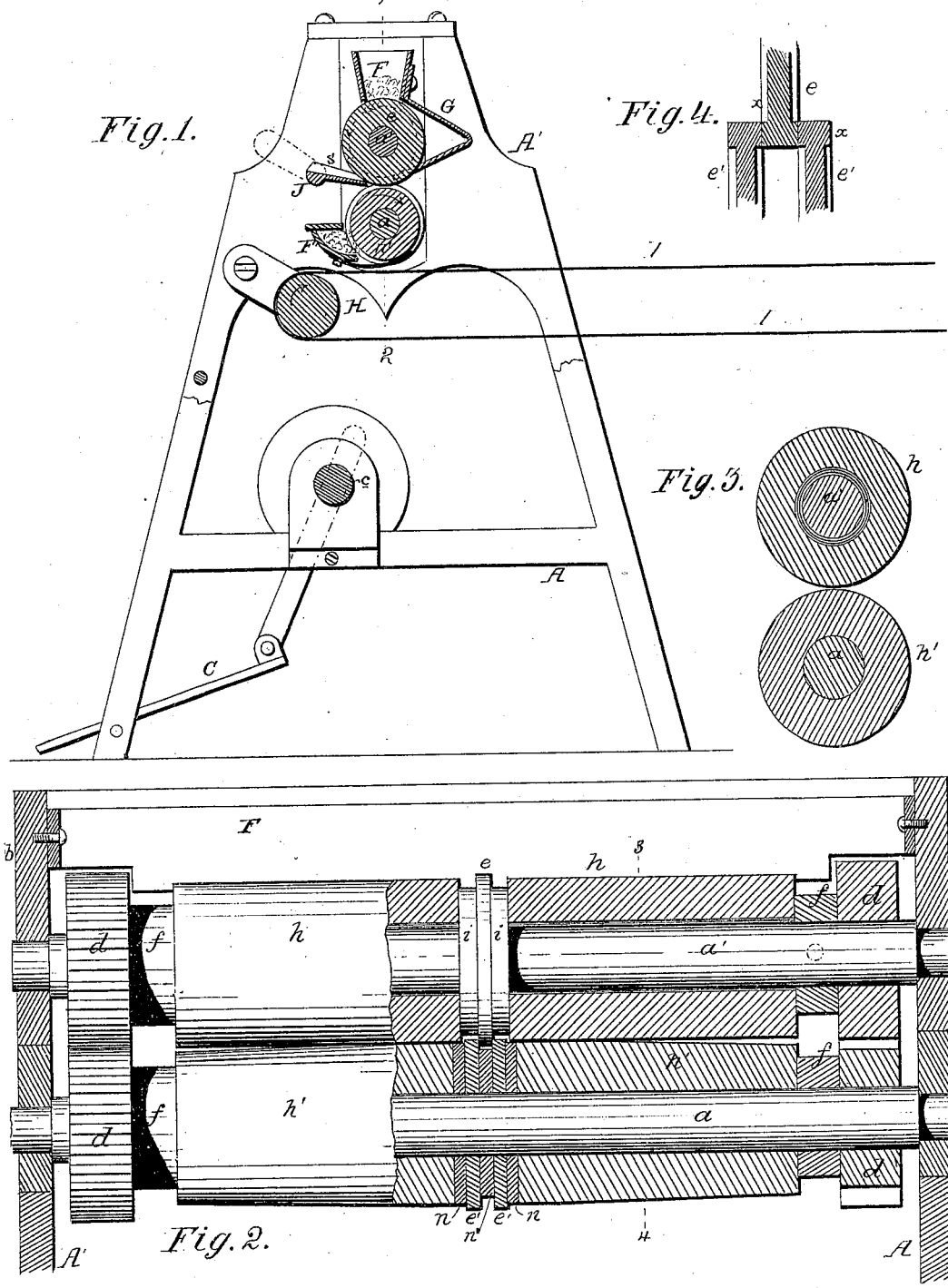

DAVID HENRY HULL, OF SYRACUSE, NEW YORK.

IMPROVEMENT IN TOBACCO-STRIPPING MACHINES.

Specification forming part of Letters Patent No. 174,819, dated March 14, 1876; application filed March 6, 1876.

*To all whom it may concern:*

Be it known that I, DAVID HENRY HULL, of Syracuse, Onondaga county, New York, have invented Improvements in Tobacco-Stripping Machines, of which the following is the specification:

The object of my invention is a machine whereby the stems may be rapidly cut from tobacco leaves, without tearing or wounding the latter, subjecting them to undue pressure, or removing any of the valuable portions of the leaves.

In the accompanying drawing, Figure 1 is a sectional elevation of the machine; Fig. 2, an enlarged section on the line 1 2, Fig 1; Fig. 3, a section on the line 3 4, Fig. 2; and Fig. 4 an enlarged transverse section, showing the construction of the cutters.

A A' are the side pieces of the frame of the machine, connected by suitable cross-bars, and having recesses to receive movable bearing-blocks $b\ b'$ for the journals of parallel shafts $a\ a'$. The shafts $a\ a'$ are geared together at each end, and a driving-shaft, $c$, turning in bearings on the frame A, is operated by a treadle, C, and carries a fly-wheel and a pulley, from which a band passes to a pulley on the end of the shaft $a$. At the center of the shaft $a'$ is secured a circular disk or cutter, $e$, having at each side a hub or collar, $i$, and on the shaft, between each hub and an adjustable collar, $f$, is secured a hollow sleeve or roller, $h$. Between each sleeve $h$ and the surface of the shaft $a'$ intervenes a sleeve or body of rubber, felt, or other elastic material, for a purpose described hereafter.

The shaft $a$ carries two loose disks or cutters, $e'\ e'$, which slightly overlap the sides of the cutter $e$, and are maintained in close contact therewith by elastic washers $u\ u$ intervening between the cutters and adjustable hollow rollers or sleeves $h'\ h'$ upon the shaft, a third washer, $u'$, between the two cutters serving as an inner bearing. The upper and lower rollers are slightly less in diameter than the respective cutters $e\ e'$, so that when the cutters overlap, as shown in Fig. 2, the surfaces of the rollers will be nearly in contact—the rollers $h'$ tapering slightly toward their outer ends for a purpose described hereafter.

To the movable bearing-blocks $b$ of the upper shaft are bolted the upper ends of a box, F, open at the top and bottom, the box, bearing-blocks, and shaft forming a rigid structure, which may readily be removed, without altering the position of any of the parts, to obtain access to the lower shaft.

A box, F', is arranged opposite the lower rollers, is open at the side next the latter, and is provided with a detachable top, and both boxes are filled with sponge or other fibrous material, which will absorb and retain a supply of water, or other suitable fluid or mixture.

To the rear side of the box F is bolted a clearing-plate, G, the lower forked end of which is tangential to the roller $e$, and embraces the latter, bearing upon the faces of the hubs $i$.

To a shaft, J, turning in bearings on the side frames, is secured a grooved spout or guide, $s$, which extends below the cutter $e$, as shown in Fig. 1, and to the shaft J is connected a weighted arm, which tends to maintain the guide in close proximity to the cutter, a stop suitably arranged preventing absolute contact.

A roller, H, turns in bearings on the side frames beneath and in front of the lower roller $h'$, and round the said roller, and round a similar roller at the rear of the machine, passes an endless band, I. A rotary motion is imparted to the roller H from the driving-shaft through the medium of any suitable gearing, the shafts $a\ a'$, with their cutters and rollers, turning simultaneously in the direction of their arrows, Fig. 1.

The leaf to be stripped is placed, with either end forward, with its stem in the groove of the guide $s$, and is pushed toward the rolls, between which it is griped at both sides and drawn inward, while the cutters $e\ e'$ shear the leaf on each side of, and in such close proximity to, the stem, as will prevent the waste of any valuable portion. Owing to the tapering form of the rollers $h'$, the leaf, while griped adjacent to the knives, is not subjected to pressure at its outer edges, and therefore is not injured if the said edges are folded, as is frequently the case, while, as the rollers $h$ will yield radially, leaves of varying thickness are grasped firmly without being wounded. As the cutters $e'$ bear with a yielding pressure against the sides of the cutter $e$, all the cutters are maintained in constant contact, however great may be the wear, so as to always insure a clear shearing of the leaf and avoid the tearing of the latter which might otherwise occur.

In order to facilitate the sharpening of the knives each is formed with a narrow rib, $x$, on each side, the ribs being more readily ground than the entire sides of the knives, and, owing to their reduced width, being more readily and uniformly tempered or hardened than the thick edges of disks of uniform width.

Owing to the plentiful supply of water furished directly to the cutters from the boxes F F', the leaves are cut with much greater facility than if operated upon in a dry or partially-wet condition, while the grooved guide $s$ maintains the stem upon the edge of the cutter $e$, preventing the lateral displacement and injury of the leaf. The clearer G prevents the adhesion of the leaf to the cutter, and, owing to the inclination at which it is arranged, causes the leaf to pass easily from the cutter to the traversing-band I, which, being supported by its rollers below, and free from contact with the rollers $h'$, is prevented from depositing any dirt upon the latter. Both of the rollers $h$ $h'$ may be tapered, and both upper and lower rollers may be confined to the shaft so as to yield radially. Metal springs may also be substituted for rubber between the shafts, and between the rollers, and at the sides of the cutters, while the water or other fluid may be thrown upon the cutters in the form of a fine stream or spray, instead of in the manner described.

I claim—

1. The combination, in a stripping-machine, of a rotating cutter, $e$, and rotating cutters $e'$ $e'$, bearing with a yielding pressure against the sides of the cutter $e$, substantially as set forth.

2. The cutters of a stripping-machine combined with appliances for depositing upon them a constant supply of fluid, as set forth.

3. The combination, in a stripping-machine, of cutters, metal feed-rolls and rubber, or its equivalent, interposed between the rolls and their shafts or bearings, so as to permit the said rolls to yield radially, substantially as set forth.

4. The yielding guide $s$, arranged and operating in a stripping-machine, as specified.

5. The clearer G arranged tangential to the rotary cutter $e$ of a tobacco-stripping machine, with its bifurcated end bearing on the side collars of the cutter, as specified.

6. The combination of the cutters and rolls $h$ $h'$, one or both of which taper toward their outer ends, as and for the purpose specified.

7. The endless band I of a tobacco-stripper, arranged to traverse below, but free from contact with, the lower rolls, as set forth.

8. The blocks $b$ $b'$ carrying the upper shaft $a'$ and upper box F, substantially as and for the purpose specified.

9. The cutters $e$ $e'$, constructed with ribs $x$ at the sides, and arranged as and for the purpose specified.

In testimony whereof I have signed my name to this specification in the presence of two subscribing witnesses.

D. H. HULL.

Witnesses:
 CHARLES E. FOSTER,
 WILLIAM L. BRAMHALL.